United States Patent
Dietz et al.

[19]

[11] Patent Number: 6,025,778
[45] Date of Patent: Feb. 15, 2000

[54] APPARATUS AND METHOD FOR PROVIDING AN AUTOMATED BACK-UP ALARM

[75] Inventors: Hans P. Dietz, Naperville; Dale R. Shatters, Plano, both of Ill.

[73] Assignee: Caterpillar Inc., Peoria, Ill.

[21] Appl. No.: 09/113,718

[22] Filed: Jul. 10, 1998

[51] Int. Cl.$^7$ ..................................... B60Q 1/22
[52] U.S. Cl. ................ 340/463; 340/469; 340/472; 340/431; 340/384.1; 315/82; 315/83; 307/10.8
[58] Field of Search ................... 340/463, 464, 340/468, 469, 471, 472, 473, 474, 438, 439, 431, 425.5, 384.1; 315/82, 83; 307/9.1, 10.1, 10.8

[56] References Cited

U.S. PATENT DOCUMENTS

| | | | |
|---|---|---|---|
| 3,569,927 | 3/1971 | Guyton et al. | 340/463 |
| 3,720,913 | 3/1973 | Bradford | 340/463 |
| 3,728,676 | 4/1973 | Brown | 340/463 |
| 3,818,438 | 6/1974 | Stacha, Jr. | 340/463 |
| 3,827,024 | 7/1974 | Anderson et al. | 340/463 |
| 3,943,507 | 3/1976 | Neal et al. | 340/463 |
| 4,063,217 | 12/1977 | Hyde et al. | 340/463 |
| 4,220,947 | 9/1980 | Yamamoto | 340/463 |
| 4,376,909 | 3/1983 | Tagami et al. | 340/463 |
| 4,885,567 | 12/1989 | Katz | 340/463 |
| 4,896,135 | 1/1990 | Deeds et al. | 340/456 |
| 5,047,747 | 9/1991 | Gottlieb | 340/463 |
| 5,132,665 | 7/1992 | Hutchisson et al. | 340/463 |
| 5,510,763 | 4/1996 | Deckard et al. | 340/431 |
| 5,592,146 | 1/1997 | Kover, Jr. | 340/468 |
| 5,865,265 | 2/1999 | Matsumoto | 340/901 |

FOREIGN PATENT DOCUMENTS

2040092  8/1980  United Kingdom .

*Primary Examiner*—Nina Tong
*Attorney, Agent, or Firm*—Marla L. Hudson; Kevin M. Kercher

[57] ABSTRACT

An apparatus and method for providing an automated back-up alarm on a mobile machine including a back-up detector to detect enablement of rearward motion by the mobile machine, a visual indicator, an audible indicator, and a controller. The apparatus detects enablement of rearward motion by the mobile machine and a parameter representative of ambient light, and responsively activates one of the visual indicator and the audible indicator as a function of the mobile machine being enabled to move in a rearward direction and the parameter representative of ambient light.

42 Claims, 7 Drawing Sheets

Fig_4a_

Fig_4b_

APPARATUS AND METHOD FOR PROVIDING AN AUTOMATED BACK-UP ALARM

TECHNICAL FIELD

This invention relates generally to an apparatus and method for providing an automated back-up alarm on a mobile machine and, more particularly, to an apparatus and method for activating one of a visual and audible indicator as a back-up alarm on the mobile machine.

BACKGROUND ART

Mobile machines such as compactors, track-type tractors, motor graders, wheel loaders, and the like, generally operate by moving over or through a work site and have the capacity to alter the geography of the work site with a tool or operative portion of the mobile machine such as a compacting wheel, blade, shovel, bucket or the like. During operation, the mobile machines are frequently required to move in a rearward direction, i.e., in reverse.

Due to limited operator visibility toward the rear of many mobile machines, back-up alarms are often provided to warn people in the area that the mobile machine is moving in reverse. Typically, it has been the practice to provide an audible alarm as the back-up alarm. However, under certain circumstances, it may be desirable to choose either a visual alarm or an audible alarm. For example, it has long been recognized that at work sites located near residential neighborhoods, the alarm sounds of audible back-up alarms can be quite irritating to nearby s residents, especially at night. Thus, it may be desired to activate the visual alarm at night as opposed to the audible alarm.

Various back-up alarms have been developed that provide an audible alarm and a visual alarm. In British patent publication GB 2040092 A, Lin discloses an alarm system for activating a back-up alarm on a vehicle. Lin teaches activating a visual alarm at all times when the vehicle is moving in reverse. Additionally, an audible alarm is activated in combination with the visual alarm when an obstacle is detected behind the vehicle during rearward motion. However, the patent publication does not address situations in which it is desirable to activate either the audible alarm or the visual alarm singly or in combination.

The present invention is directed to overcoming one or more of the problems as set forth above.

DISCLOSURE OF THE INVENTION

In one aspect of the present invention an apparatus for providing an automated back-up alarm on a mobile machine is provided. The apparatus includes a back-up detector to detect enablement of rearward motion by the mobile machine, a visual indicator, an audible indicator, and a controller adapted to activate one of the visual indicator and the audible indicator as a function of the back-up detector and a parameter representative of ambient light.

In another aspect of the present invention a method for providing an automated back-up alarm on a mobile machine is provided. The method includes the steps of detecting enablement of rearward motion by the mobile machine, determining a parameter representative of ambient light, and activating one of a visual indicator and an audible indicator as a function of the mobile machine being enabled to move in the rearward direction and the parameter representative of ambient light.

BEST MODE FOR CARRYING OUT THE INVENTION

Throughout the specification and figures, like reference numerals refer to like components or parts. With reference to FIGS. 1–7, the present invention provides an apparatus and method for providing an automated back-up alarm 200 for use on a mobile machine 100. For purposes of discussion, the following description will include a wheel loader.

Figure 1:
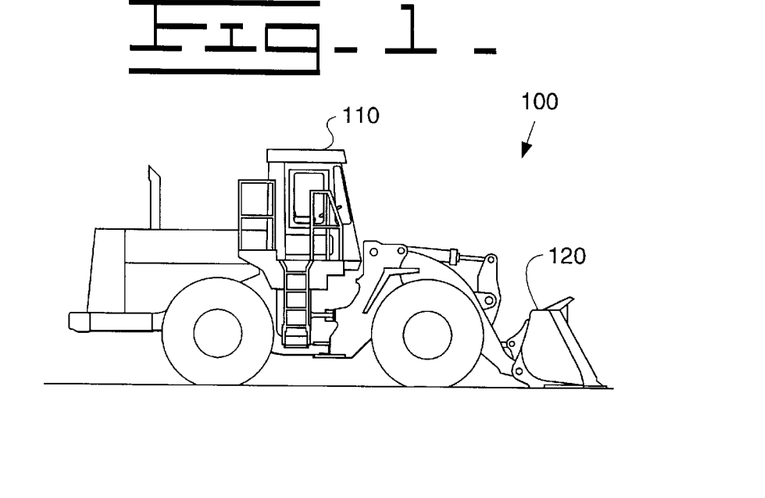
FIG. 1 is a diagrammatic illustration of a mobile machine suitable for use with the present invention.

With particular reference to FIG. 1, an illustration of a wheel loader is shown. The wheel loader includes an operator's cab 110 and a work implement 120, e.g., a bucket. While the following discussion refers to the mobile machine 100 as a wheel loader it is to be realized that other types of mobile machines 100, for example, an excavator, motor grader, truck, and the like, may be substituted without departing from the spirit of the present invention.

Figure 2:
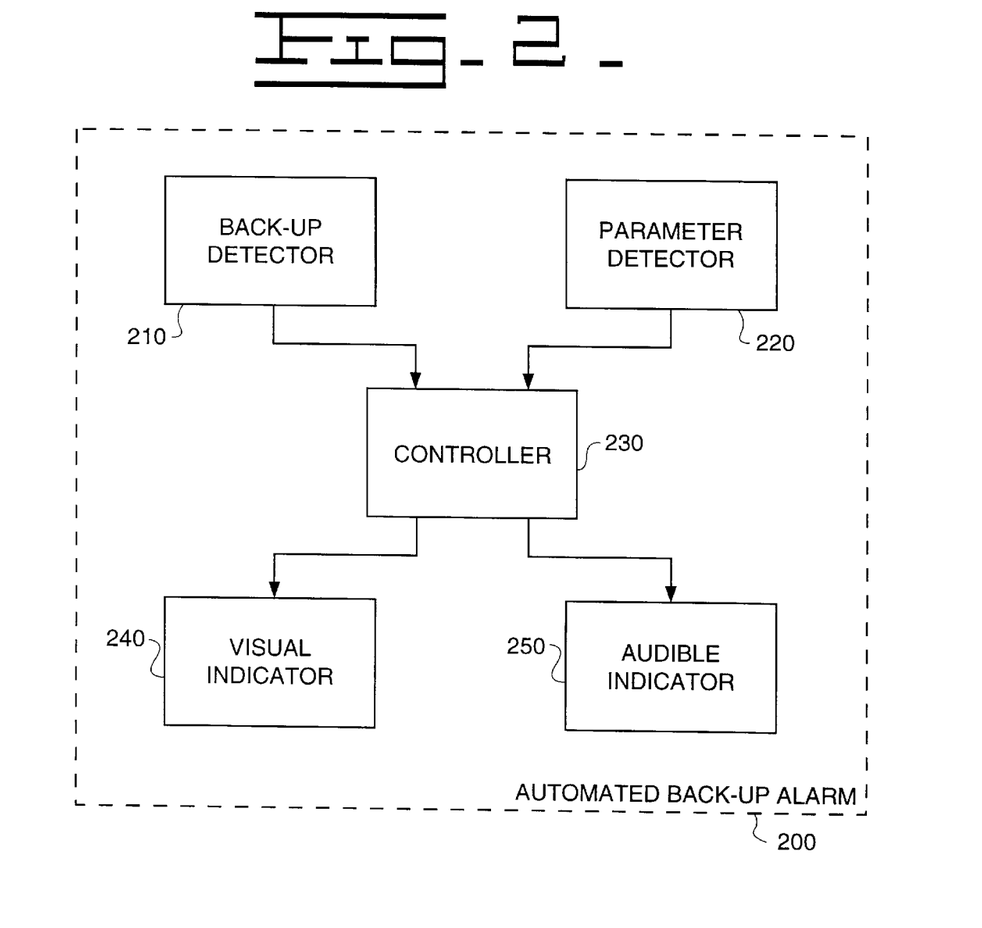
FIG. 2 is a diagrammatic illustration of one aspect of the present invention.
Figure 3:
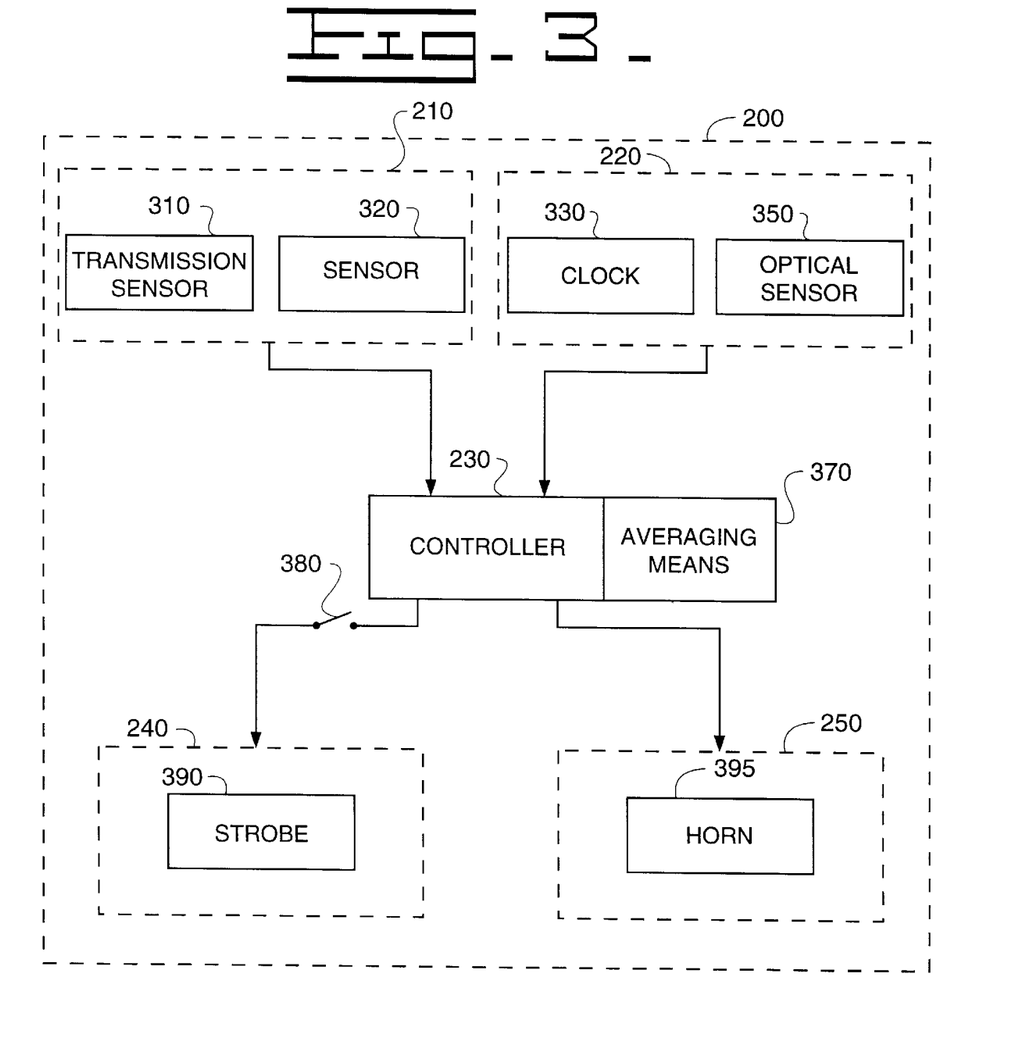
FIG. 3 is a diagrammatic illustration of an embodiment of the present invention.

Referring to FIGS. 2 and 3, an automated back-up alarm 200 includes a back-up detector 210 located on the mobile machine 100. The back-up detector 210 is adapted for detecting enablement of rearward motion by the mobile machine 100.

In one embodiment of the present invention, the back-up detector 210 includes a transmission sensor 310 which detects a transmission (not shown) located on the mobile machine 100 being in a reverse gear. Detection of the transmission being in the reverse gear may be detected by movement of an operator's transmission shift lever into the reverse position and normally causes activation of the automated back-up alarm 200 slightly in advance of actual rearward movement.

It is recognized that it also may be necessary to provide the automated back-up alarm 200 at any time that the mobile machine 100 is moving in a rearward direction regardless of the position of the transmission shift lever and including times when the mobile machine 100 is parked. Thus, in another embodiment of the present invention, the back-up detector 210 includes a direction sensor 320 which is continuously operative to detect the direction of wheel rotation of the mobile machine 100, i.e., direction of drive train motion of the mobile machine 100, and which generates signals indicative of such movement. The direction sensor 320 is adapted to detect reverse-direction rotation of the wheels of the mobile machine 100 or other rotating mechanism linked thereto.

In yet another embodiment of the present invention, the back-up detector 210 includes the transmission sensor 310 used in conjunction with the direction sensor 320 adapted to detect the direction of drive train motion. In this embodiment, the direction sensor 320 adapted to detect the direction of drive train motion provides redundancy in the back-up detector 210 at times when enablement of rearward motion by the mobile machine 100 has already been detected as a result of the transmission sensor 310 detecting shifting of the transmission into the reverse gear.

It can be appreciated by those skilled in the art that other types of sensors and combinations thereof may be included in the back-up detector 210 without deviating from the present invention. As an example, a speed sensor located in the transmission may be used to sense the rotational speed of the transmission. Enablement of rearward motion by the mobile machine 100 is detected when the output from the speed sensor is a negative value.

The back-up detector 210 delivers an electrical signal to a controller 230 located on the mobile machine 100, indicating enablement of rearward motion by the mobile machine 100. In the preferred embodiment, the controller 230 is a microprocessor. However, a non-microprocessor based controller 230 may be used. For example, the controller 230 may be comprised of discrete electronic components.

The controller 230 also receives information from a parameter detector 220 which is used by the controller 230 to determine a condition representative of ambient light.

In one embodiment of the present invention, the parameter detector 220 optically detects a level of ambient light. The optical sensor 350 delivers an electrical signal to the controller 230 proportional to the level of ambient light detected.

In one embodiment of the present invention, a plurality of optical sensors 350 are located on a mobile machine 100 that is articulated in the middle, i.e., the mobile machine 100 consists of a front section pivotally connected to a rear section. The optical sensors 350 are positioned in a manner whereby each optical sensor 350 detects the level of ambient light present at a respective section of the mobile machine 100. For example, optical sensors 350 may be located at each of the front left section, front right section, rear left section, and rear right section, respectively, of the mobile machine 100. The positioning of the optical sensors 350 allows for increased accuracy in the determination of the level of ambient light in the event of an aberrant reading of one or more of the optical sensors 350.

Additionally, the environment may occasionally experience sudden changes in ambient light levels, such as a flash of lightning or other bright light, resulting in aberrant readings from the optical sensors 350. To compensate for these aberrant readings, averaging means 370 may be implemented to average a plurality of levels of ambient light detected by the optical sensors 350 over a predetermined period of time, e.g., one minute. Preferably, the averaging means 370 is implemented in an internal segment of program in the controller 230. However, the averaging means 370 may also be implemented in an external device, separate from the controller 230 without deviating from the scope of the present invention. By compensating for sudden changes in ambient light, the controller 230 is able to more accurately determine the appropriate indicator to activate as the back-up alarm. The operation of the controller 230 will be discussed in more detail below.

In a second embodiment of the present invention, the parameter detector 220 detects a time determined by a clock 330 located on the mobile machine 100. The clock 330 continuously generates an electrical signal representing the current time which is received by the controller 230. The controller 230 makes a determination of day or night based on the time indicated by the clock 330. The clock is useful at sites that are surrounded by large work lights or streetlights. Under these conditions, the optical sensor 350 would be inappropriate because it would always detect a high level of ambient light due to the artificial lights, thus preventing the controller 230 from ever making a determination of night. The clock 330 allows the controller 230 to make a determination of day or night as a function of the time indicated by the clock, and a predefined determination of the times for day and for night.

In a third embodiment of the present invention, the parameter detector 220 detects the activation of a set of lights, e.g., headlights located on the mobile machine 100. In this embodiment, the controller 230 assumes a low ambient light when the headlights of the mobile machine 100 are activated.

Alternatively, the time is determined by a clock 330 in conjunction with the level of ambient light 360 being detected by an optical sensor 350. This embodiment is particularly useful in foggy or dusty conditions in which the optical sensor 350 may detect a low level of ambient light, which may not be truly indicative of day or night. Other parameter detectors 220 may be used to detect parameters to determine a condition of ambient light without deviating from the present invention.

The controller 230 is electrically connected to a visual indicator 240 located on the mobile machine 100 and an audible indicator 250 located on the mobile machine 100. The controller 230 activates either the visual indicator 240 or the audible indicator 250 in response to the electrical signals delivered by the back-up detector 210 and the parameter detector 220. More specifically, the visual indicator 240 is activated when the controller 230 makes the determination of night and the audible indicator 240 is activated when the controller 230 makes the determination of day.

The audible indicator 250 includes a horn 395 or any other sound-emitting device. In the preferred embodiment, the audible indicator 250 emits an intermittent audible tone. Alternately, the audible indicator 250 may emit a continuous audible tone. The continuous audible tone may be of varying pitch indicating various warnings.

Figure 4A:
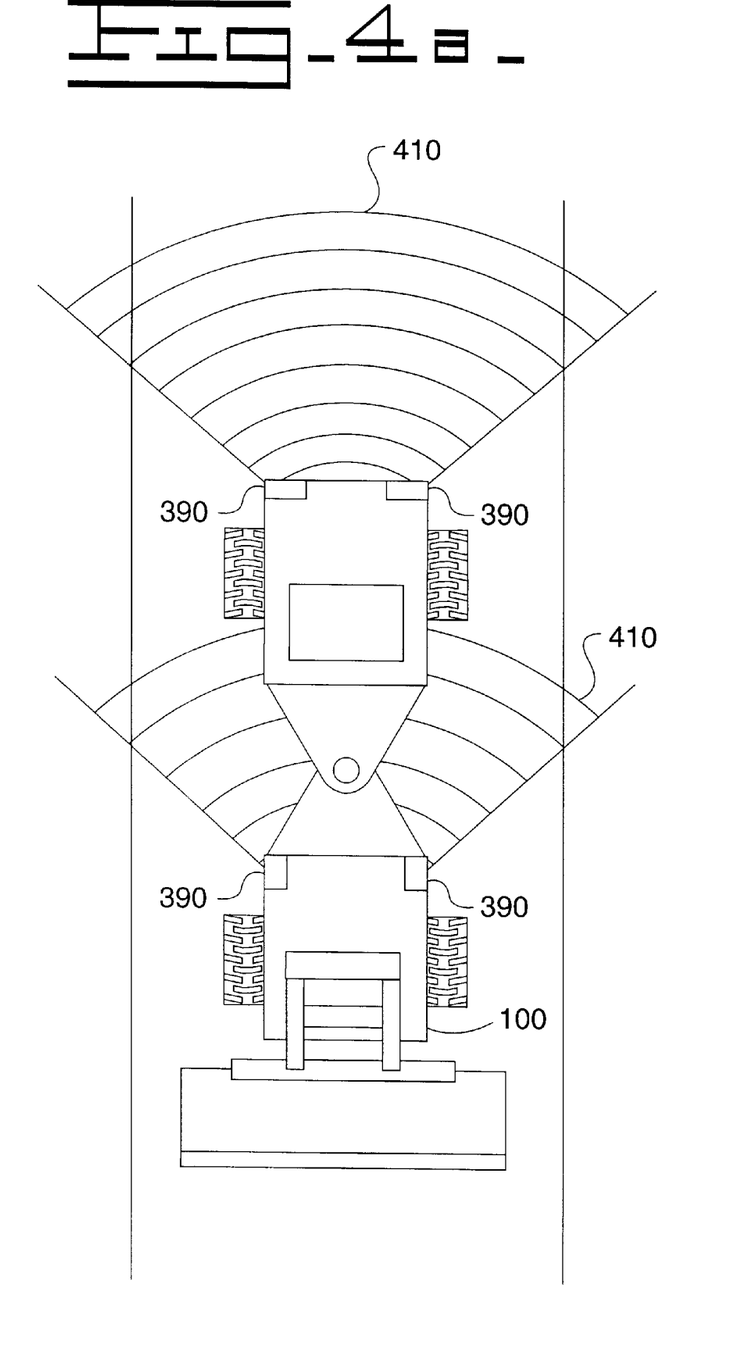
FIGS. 4a and 4b are diagrammatic illustrations of areas located rearward of the mobile machine.
Figure 4B:
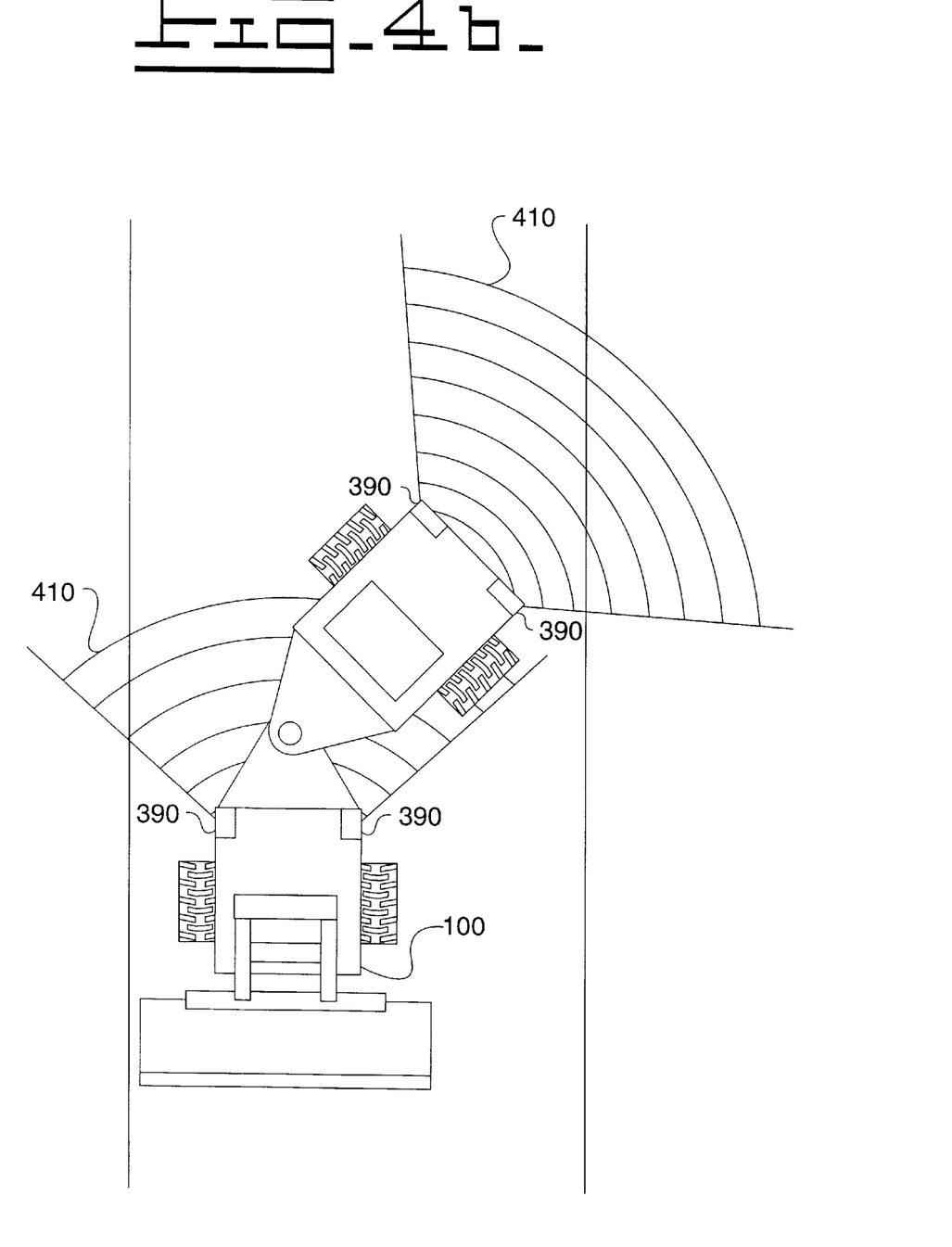

Referring to FIGS. 4a and 4b, a diagrammatic top view of an articulated mobile machine 100 having a front section pivotally connected to a rear section is shown. The visual indicator 240, e.g., a strobe 390, is adapted to provide a visual indication to back-up area 410 located rearward of the mobile machine 100. In the preferred embodiment, four strobes 390 producing high-intensity, short duration light flashes may be located on the mobile machine 100. Strobes 390 may be located at each of the front left section, front right section, rear left section, and rear right section, respectively, of the mobile machine 100. In this manner, visual indication is provided to the back-up area 410 associated with each of the respective sections of the mobile machine 100.

A visual indicator disable switch 380 may be provided to enable the operator to manually disable the visual indicator 240. When the visual indicator disable switch 380 is in an open state, the controller 230 activates only the audible indicator 250 when enablement of rearward motion by the mobile machine 100 is detected, regardless of whether the controller 230 has determined that it is day or night. Furthermore, the controller 230 activates only the audible indicator 250, when a fault of the visual indicator 240 is detected, e.g., a malfunctioning strobe 390 or burned out bulb.

Although the optical sensor 350, clock 330 and controller 230 have been described as being located on the mobile machine 100 and electrically connected together as part of an integral and comprehensive on-board automated back-up alarm 200, some or all elements may be stationed remotely from the mobile machine 100. For example, the controller 230 may be located at a central site office and adapted to communicate with the audible indicator 250, visual indicator 240, back-up detector 210, optical sensor 350, clock 330, and other machine controls through a wireless communication link.

Figure 5:
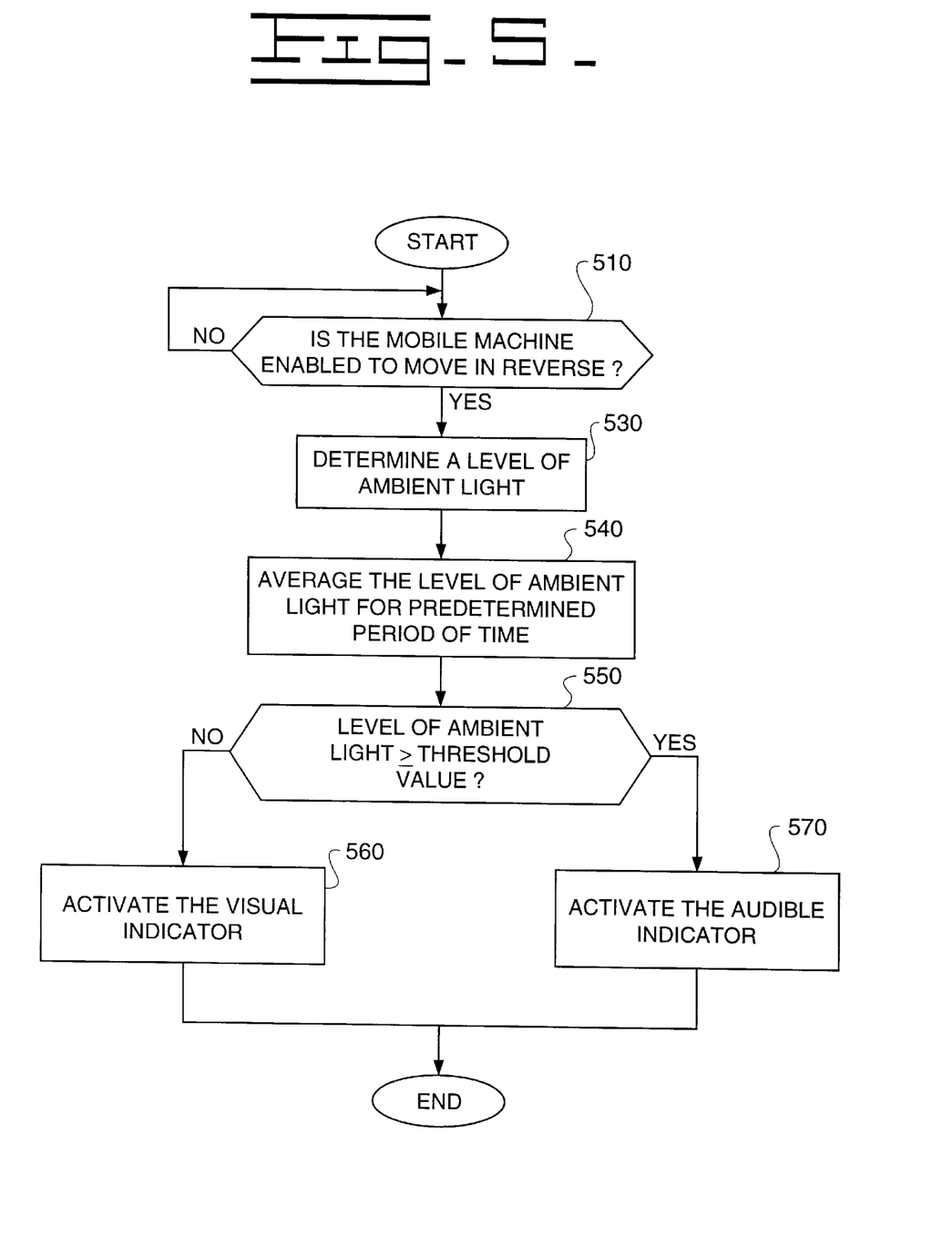
FIG. 5 is a flowchart illustrating an embodiment of the present invention.
Figure 6:
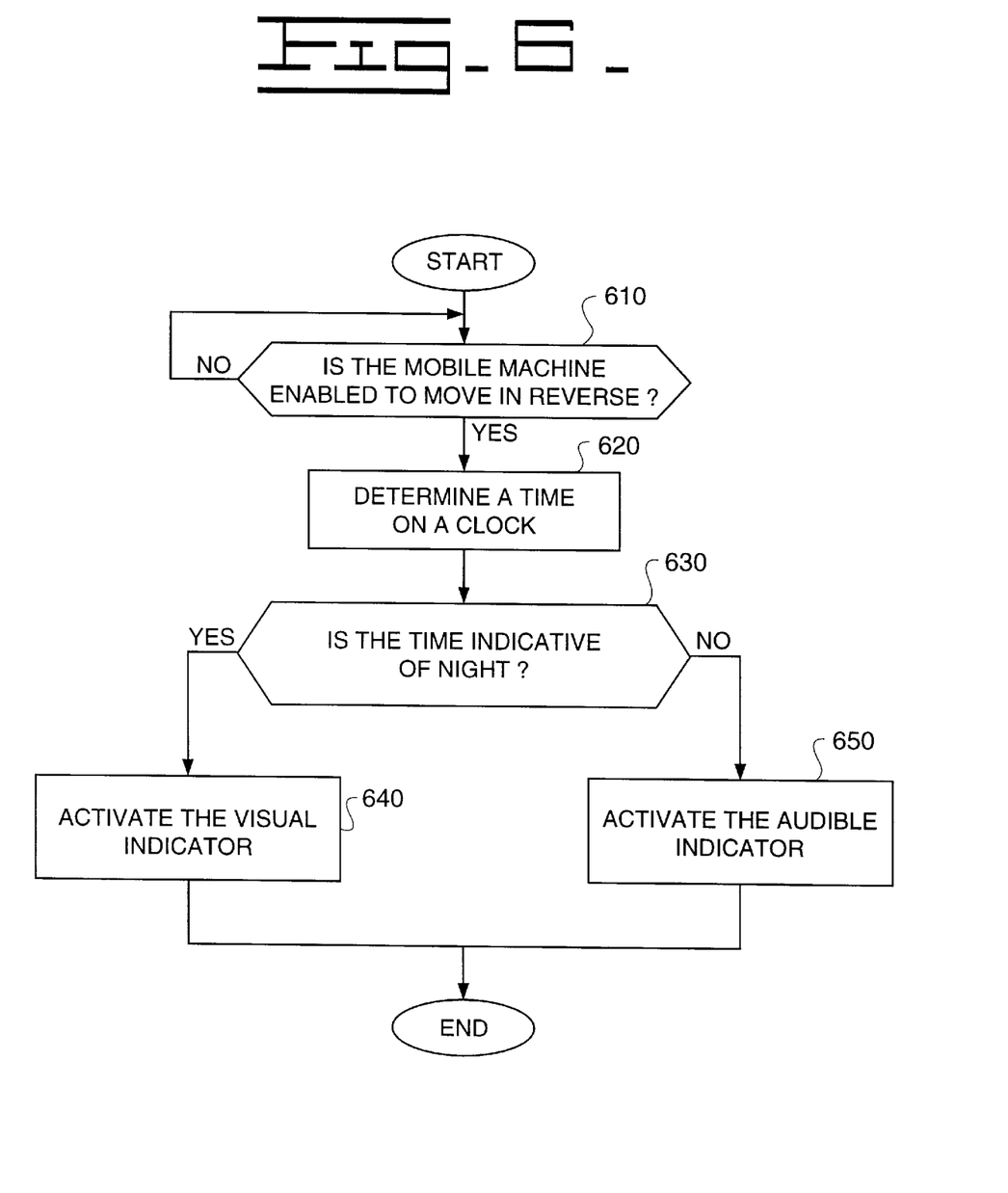
FIG. 6 is a flowchart illustrating another embodiment of the present invention.
Figure 7:
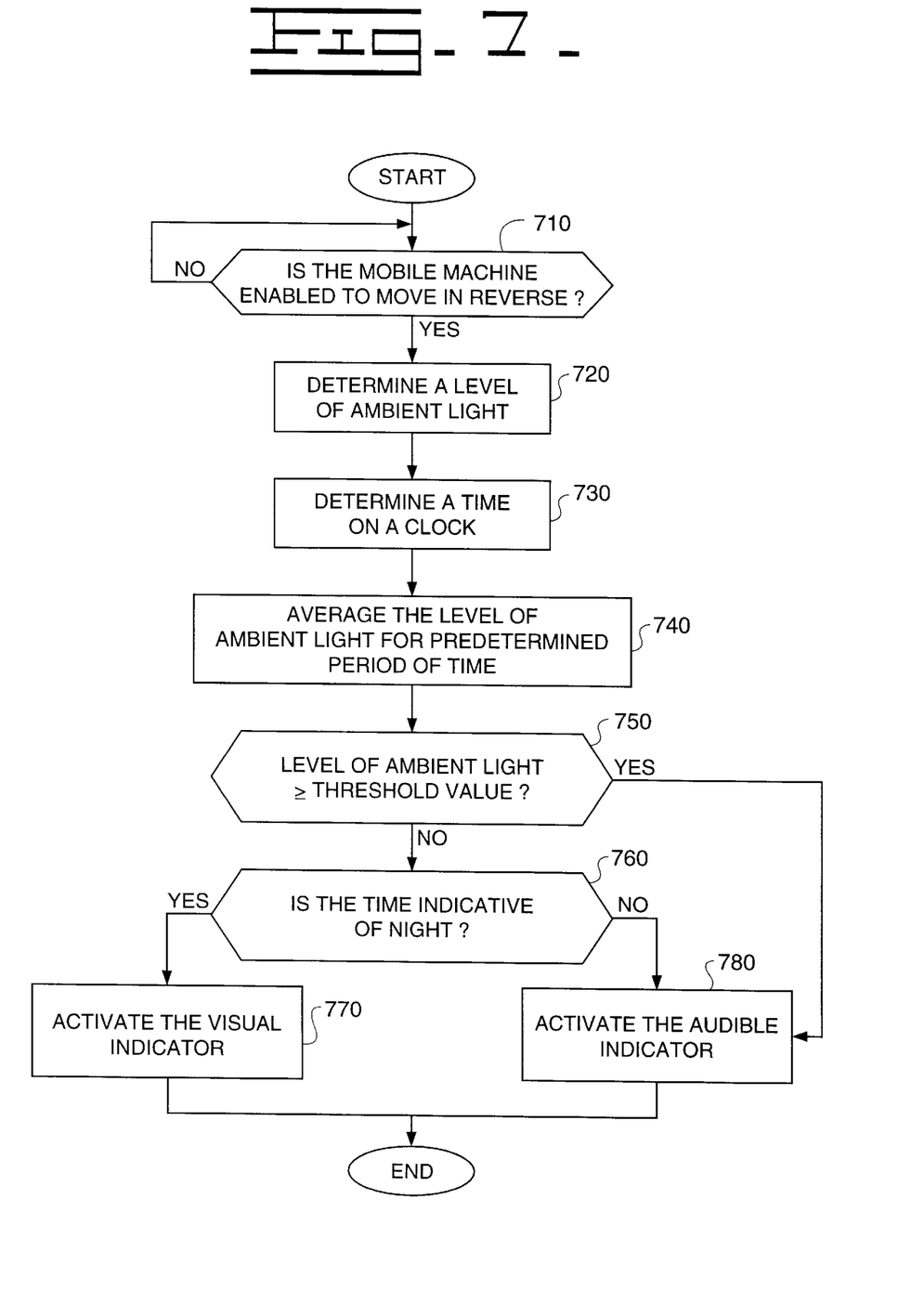
FIG. 7 is a flowchart illustrating yet another embodiment of the present invention.

With reference to FIGS. 5–7, operation of the automated back-up alarm 200 is now discussed. Referring to FIG. 5, in a first decision block 510 the back-up detector 210 detects whether the mobile machine 100 is enabled to move in a rearward direction. A back-up condition signal indicating enablement of rearward motion by the mobile machine 100 is delivered to the controller 230.

In a first embodiment of the present invention, the controller 230 determines the level of ambient light in a first control block 530 based on the ambient light detected by the optical sensor 350. In a second control block 540 the averaging means 370 averages the levels of ambient light 360 for a predetermined period of time, e.g., one minute, to compensate for sudden changes in ambient light levels.

In a second decision block 550, the controller 230 determines if the level of ambient light exceeds a predetermined threshold value. The controller 230 makes a determination of night if the level of ambient light does not exceed the threshold value and activates the visual indicator 240 in a third control block 560. Otherwise, the controller 230 makes a determination of day if the level of ambient light exceeds or is equivalent to the threshold value and activates the audible indicator 250 in a fourth control block 570.

With reference to FIG. 6, a flowchart is shown illustrating operation of a second embodiment of the present invention. In a first decision block 610 the back-up detector 210 detects whether the mobile machine 100 is enabled to move in a rearward direction and delivers a back-up condition signal to the controller 230. In a first control block 620, the clock 330 delivers a signal representing the time to the controller 230. The controller 230 determines whether the time is indicative of night in a second decision block 630. If the time is indicative of night, the controller 230 makes the determination of night and activates the visual indicator 240 in a second control block 640. Otherwise, if the controller 230 determines that the time is not indicative of night, the controller 230 makes the determination of day and activates the audible indicator 250 in a third control block 650.

With reference to FIG. 7, a flowchart is shown illustrating the operation of a third embodiment of the present invention. In a first decision block 710 the back-up detector 210 detects whether the mobile machine 100 is enabled to move in a rearward direction and delivers a back-up condition signal to the controller 230. The controller 230 determines the level of ambient light in a first control block 720 based on the ambient light detected by the optical sensor 350. In a second control block 730, the clock 330 delivers a signal representing the time to the controller 230. In a third control block 740 the averaging means 370 averages the levels of ambient light 360 for a predetermined period of time, e.g., one minute, to compensate for sudden changes in ambient light levels. In a second decision block 750, the controller 230 determines whether the level of ambient light exceeds a predetermined threshold value. If the level of ambient light exceeds or is equivalent to the threshold value, the controller 230 makes the determination of day and activates the audible indicator 250 in a fourth control block 780.

Otherwise, control passes to a third decision block 760 where the controller 230 determines whether the time is indicative of night. If the time is indicative of night and the level of ambient light does not exceed the threshold value, the controller makes the determination of night and activates the visual indicator 250 in a fifth control block 770. Otherwise, if the time is not indicative of night and the level of ambient light does not exceed the threshold value (perhaps due to foggy or dusty conditions), the controller 230 makes the determination of day and activates the audible indicator 250 in the fourth control block 780.

INDUSTRIAL APPLICABILITY

As one example of an application of the present invention, wheel loaders are used generally to move mass quantities of material. In such applications, the wheel loader frequently moves in a rearward direction when transferring material from one location such as a stock pile to another location such as a loading truck. For example, after engaging the pile to load the bucket, the operator usually moves the wheel loader in a rearward direction in order to clear the pile and travel to its destination. As the wheel loader is enabled to move in a rearward direction, a back-up alarm is activated to warn people in the area that the wheel loader is moving in reverse.

Since an ever growing number of work sites are located near residential neighborhoods and frequently operate at night, it is becoming increasingly desirable to reduce the noise created at these work sites.

The present invention provides a cost effective solution to eliminating back-up alarm noise of mobile machines at night while offering the advantage of providing a visual indicator as a back-up alarm at night. This distinctive feature makes the present invention ideal for work sites located near residential neighborhoods.

Other aspects, objects, and features of the present invention can be obtained from a study of the drawings, the disclosure, and the appended claims.

We claim:

1. An apparatus for providing an automated back-up alarm on a mobile machine, comprising:
   a visual indicator;
   an audible indicator;
   a back-up detector adapted to detect enablement of rearward motion by the mobile machine;
   a parameter detector adapted to detect a parameter representative of ambient light; and
   a controller in communication with the visual indicator, the audible indicator, the back-up detector, and the parameter detector, the controller being adapted to activate one of the visual indicator and the audible indicator as a function of the mobile machine being enabled to move in a rearward direction, and the parameter representative of ambient light.

2. An apparatus, as set forth in claim 1, wherein the visual indicator is adapted to provide a visual indication to an area located rearward of the mobile machine.

3. An apparatus, as set forth in claim 2, wherein the visual indicator includes a strobe.

4. An apparatus, as set forth in claim 1, further including a visual indicator disable switch adapted for manually disabling the visual indicator.

5. An apparatus, as set forth in claim 1, wherein the audible indicator is adapted to provide at least one of a continuous audible tone, an intermittent audible tone, and a horn.

6. An apparatus, as set forth in claim 1, wherein the back-up detector includes a transmission sensor, the transmission sensor being adapted to detect a transmission located on the mobile machine being in a reverse gear.

7. An apparatus, as set forth in claim 1, wherein the back-up detector includes a direction sensor, the direction sensor being adapted to detect direction of drive train motion of the mobile machine.

8. An apparatus, as set forth in claim 1, wherein the back-up detector includes both a transmission sensor, the transmission sensor being adapted to detect a transmission located on the mobile machine being in a reverse gear, and a direction sensor, the direction sensor being adapted to detect direction of drive train motion of the mobile machine.

9. An apparatus, as set forth in claim 1, wherein the controller includes a microprocessor.

10. An apparatus, as set forth in claim 1, wherein the controller is located remote from the mobile machine, the controller being adapted to communicate with the visual indicator, the audible indicator, the back-up detector, and the parameter detector through a wireless communication link.

11. An apparatus, as set forth in claim 1, wherein the parameter detector includes an optical sensor, the parameter representative of ambient light being a level of ambient light detected by the optical sensor.

12. An apparatus, as set forth in claim 11, wherein the optical sensor is located on the mobile machine.

13. An apparatus, as set forth in claim 11, wherein the optical sensor is located remote from the mobile machine.

14. An apparatus, as set forth in claim 11, further including an averaging means, the averaging means being adapted to average a plurality of levels of ambient light, wherein the controller activates one of the visual indicator and the audible indicator as a function of the mobile machine being enabled to move in a rearward direction, and the average of the plurality of levels of ambient light.

15. An apparatus, as set forth in claim 1, wherein the parameter detector includes a clock, wherein the parameter representative of ambient light is a time determined by the clock.

16. An apparatus, as set forth in claim 1, wherein the controller is adapted to activate one of the visual indicator and the audible indicator as a function of the mobile machine being enabled to move in a rearward direction, and both a time, the time being determined by a clock, and a level of ambient light.

17. An apparatus, as set forth in claim 1, wherein the controller is adapted to activate one of the visual indicator and the audible indicator as a function of the mobile machine being enabled to move in a rearward direction, and at least one of a time, the time being determined by a clock, and a level of ambient light.

18. An apparatus, as set forth in claim 1, further including a set of lights located on the mobile machine, wherein the controller is adapted to activate one of the visual indicator and the audible indicator as a function of the mobile machine being enabled to move in a rearward direction, the parameter representative of ambient light, and the set of lights located on the mobile machine being activated.

19. A method for providing an automated back-up alarm on a mobile machine, including the steps of:

detecting enablement of rearward motion by the mobile machine;

determining a parameter representative of ambient light; and activating one of a visual indicator and an audible indicator as a function of the mobile machine being enabled to move in a rearward direction and the parameter representative of ambient light.

20. A method, as set forth in claim 19, wherein determining the parameter representative of ambient light includes the step of determining a level of ambient light.

21. A method, as set forth in claim 20, further including the step of determining the level of ambient light relative to a threshold value.

22. A method, as set forth in claim 20, wherein determining the parameter representative of ambient light includes the step of averaging the level of ambient light over a predetermined period of time.

23. A method, as set forth in claim 20, wherein determining the level of ambient light includes the step of optically sensing a presence of ambient light.

24. A method, as set forth in claim 19, wherein determining the parameter representative of ambient light includes the step of determining a time on a clock.

25. A method, as set forth in claim 19, wherein determining the parameter representative of ambient light includes the steps of:

determining a level of ambient light; and determining a time on a clock.

26. A method, as set forth in claim 19, wherein detecting enablement of rearward motion by the mobile machine includes the step of detecting a transmission on the mobile machine being in a reverse gear.

27. A method, as set forth in claim 19, wherein detecting enablement of rearward motion by the mobile machine includes the step of detecting direction of drive train motion of the mobile machine.

28. A method, as set forth in claim 19, wherein detecting enablement of rearward motion by the mobile machine includes the step of:

detecting at least one of a transmission on the mobile machine being in a reverse gear and direction of drive train motion of the mobile machine.

29. A method, as set forth in claim 19, further including the steps of:

determining a disabled condition associated with the visual indicator; and activating the audible indicator in response to determining the disabled condition associated with the visual indicator and that the mobile machine is enabled to move in a rearward direction.

30. A method, as set forth in claim 29, wherein determining the disabled condition associated with the visual indicator includes determining a state of a visual indicator disable switch.

31. A method, as set forth in claim 29, wherein determining the disabled condition associated with the visual indicator includes determining a fault of the visual indicator.

32. A method, as set forth in claim 19, further including the step of activating one of the visual indicator and the audible indicator as a function of the mobile machine being enabled to move in a rearward direction and a set of lights located on the mobile machine being activated.

33. A method, as set forth in claim 19, further including the step of activating the visual indicator as a function of the mobile machine being enabled to move in a rearward direction, a set of lights located on the mobile machine being activated, and the parameter representative of ambient light.

34. An apparatus for providing an automated back-up alarm for a mobile machine, comprising:

means for detecting enablement of rearward motion by the mobile machine;

means for determining a parameter representative of ambient light; and means for activating one of a visual indicator and an audible indicator as a function of the mobile machine being enabled to move in a rearward direction and the parameter representative of ambient light.

35. An apparatus, as set forth in claim 34, further comprising:

means for determining a disabled condition associated with the visual indicator; and means for activating the audible indicator in response to determining the disabled condition associated with the visual indicator and determining that the mobile machine is enabled to move in a rearward direction.

36. An apparatus, as set forth in claim 34, further comprising means for activating the visual indicator as a function of the mobile machine being enabled to move in a rearward direction and a set of lights located on the mobile machine being activated.

37. An apparatus, as set forth in claim 34, further comprising means for activating the visual indicator as a function of the mobile machine being enabled to move in a rearward direction, a set of lights located on the mobile machine being activated, and the parameter representative of ambient light.

38. An apparatus for providing an automated back-up alarm on a mobile machine, comprising:

a strobe, the strobe being adapted to provide a visual indication to an area located rearward of the mobile machine;

an audible indicator;

a transmission sensor, the transmission sensor being adapted to detect a transmission located on the mobile machine being in a reverse gear;

a direction sensor, the direction sensor being adapted for detecting direction of drive train motion of the mobile machine;

an optical sensor adapted to detect a level of ambient light; and a controller in communication with the strobe, the audible indicator, the transmission sensor, the direction sensor, and the optical sensor, the controller being adapted to activate one of the strobe and the audible indicator as a function of the transmission sensor, the direction sensor, and the level of ambient light detected by the optical sensor.

39. An apparatus for providing an automated back-up alarm on a mobile machine, comprising:

a strobe, the strobe being adapted to provide a visual indication to an area located rearward of the mobile machine;

an audible indicator, the audible indicator being adapted to provide an intermittent audible tone;

a transmission sensor, the transmission sensor being adapted to detect a transmission located on the mobile machine being in a reverse gear;

a clock adapted to determine a time; and a controller in communication with the strobe, the audible indicator, the transmission sensor, and the clock, the controller being adapted to activate one of the strobe and the audible indicator as a function of the transmission sensor and the time determined by the clock.

40. An apparatus for providing an automated back-up alarm on a mobile machine, comprising:

a visual indicator, the visual indicator being adapted to provide a visual indication to an area located rearward of the mobile machine;

an audible indicator, the audible indicator being adapted to provide a continuous audible tone;

a transmission sensor, the transmission sensor being adapted to detect a transmission located on the mobile machine being in a reverse gear;

a direction sensor, the direction sensor being adapted for detecting direction of drive train motion of the mobile machine;

a clock adapted to determine a time;

an optical sensor adapted to detect a level of ambient light; and a controller in communication with the visual indicator, the audible indicator, the transmission sensor, the direction sensor, the clock, and the optical sensor, the controller being adapted to activate one of the visual indicator and the audible indicator as a function of the transmission sensor, the direction sensor, the time determined by the clock, and the level of ambient light detected by the optical sensor.

41. An apparatus for providing an automated back-up alarm on a mobile machine, comprising:

a plurality of strobes, the plurality of strobes being adapted to provide a visual indication to an area located rearward of the mobile machine;

an audible indicator;

a transmission sensor associated with a transmission shift lever, the transmission sensor being adapted to detect a transmission located on the mobile machine being in a reverse gear;

a direction sensor, the direction sensor being adapted for detecting direction of drive train motion of the mobile machine;

a clock adapted to determine a time;

a plurality of optical sensors adapted to detect a level of ambient light; and a controller in communication with the plurality of strobes, the audible indicator, the transmission sensor, the direction sensor, the clock, and the plurality of optical sensors, the controller being adapted to activate at least one of the plurality of strobes and the audible indicator as a function of the transmission sensor, the direction sensor, the time determined by the clock, and the level of ambient light detected by the plurality of optical sensors.

42. An apparatus for providing an automated back-up alarm on a mobile machine, comprising:

a visual indicator;

an audible indicator;

a back-up detector adapted to detect enablement of rearward motion by the mobile machine;

a clock adapted to determine a time; and a controller in communication with the visual indicator, the audible indicator, the back-up detector, and the clock, the controller being adapted to activate one of the visual indicator and the audible indicator as a function of the mobile machine being enabled to move in a rearward direction, and the time determined by the clock.

* * * * *